United States Patent Office 3,448,195
Patented June 3, 1969

3,448,195
INSECTICIDAL COMPOSITIONS AND METHODS EMPLOYING NAPHTHYL FLUOROACETAMIDES
Saburo Kano, Toyama-ken, Kanji Taniguchi, Kanagawa-ken, Aritsune Kaji, Toyama-ken, Mitsuo Asada, Kanagawa-ken, Daigaku Takiguchi, Toyama-ken, Nobuo Sato, Tokyo-to, and Teruhisa Noguchi, Kanagawa-ken, Japan, assignors to Nippon Soda Kabushiki Kaisha, Tokyo-to, Japan, a company of Japan
No Drawing. Continuation of application Ser. No. 422,523, Dec. 31, 1964. This application Aug. 16, 1966, Ser. No. 572,861
Claims priority, application Japan, Nov. 4, 1964, 39/6,224; May 2, 1964, 39/28,623; Feb. 19, 1964, 39/8,578, 39/8,571, 39/8,569
Int. Cl. A01n 9/20; C07c 103/32
U.S. Cl. 424—324            5 Claims

ABSTRACT OF THE DISCLOSURE

This invention relates to certain novel N-substituted fluoroacetamides valuable as insecticides and suitable in particular for use as plant-protecting agents, and relates to certain new processes for preparing them.

---

This application is a continuation application of Ser. No. 422,523, filed Dec. 31, 1964, and now abandoned.

The novel compounds in the present invention are characterized by the structural Formula I.

$$\text{Ar}-\underset{\underset{R}{|}}{N}-COCH_2F \quad (I)$$

wherein Ar is selected from the group consisting of a phenyl radical, a chlorophenyl radical, a trichlorophenyl radical, a fluorophenyl radical, a nitrophenyl radical, a napthyl radical; a thiazolyl radical, a dimethylthiazolyl radical, a nitrothiazolyl radical and a thiocyanatothiazolyl radical, and R is selected from the group consisting of an alkyl radical containing at most 4 carbon atoms, a hydroxyalkyl radical containing from 2 to 4 carbon atoms, a benzyl radical and a naphthylmethyl radical.

These compounds have the outstanding characteristic of being less poisonous to warm blooded animals but not less toxic to insects such as mite, scale and their pre-emergence (egg) in comparison of N-unsubstituted fluoroacetamides such as the compounds represented by Formula I wherein R is hydrogen.

Our improved compounds may be prepared according to the following Equations A and $B_1$ and $B_2$.

$$\text{Ar}-\underset{\underset{R}{|}}{N}-H + FCH_2 \cdot COCl \longrightarrow \text{Ar}-\underset{\underset{R}{|}}{N}-COCH_2F(HCl)$$
(A)

$$\text{Ar}-NH_2 + FCH_2 \cdot COCl \longrightarrow \text{Ar}-NH \cdot COCH_2F(+HCl)$$
($B_1$)

$$\text{Ar}-\underset{\underset{H}{|}}{N}-COCH_2F + (RO)_2SO_2 \xrightarrow{NaOH}$$

$$\text{Ar}-\underset{\underset{R}{|}}{N}-COCH_2F$$
($B_2$)

wherein R is lower alkyl radical.

These reactions are well-known and proceeding smoothly, but these processes have a decisive fault that fluoroacetylchloride as starting material is volatile and extremely strongly poisonous to human beings as well as warm blooded animals.

The processes proposed in this invention comprise a novel reaction of amine hydrochlorides with fluoro- or chloroacetic acid in the presence of chlorides of phosphorus and do not comprise the reaction of fluoroacetyl-chloride, and they are shown in Equations C and $D_1$ and $D_2$.

$$\text{Ar}-\underset{\underset{H}{|}}{N}H \cdot HCl + FCH_2COOH \xrightarrow{\text{chloride of phosphorous}}$$

$$\text{Ar}-\underset{\underset{R}{|}}{N}-CO \cdot CH_2F$$
(C)

$$\text{Ar}-\underset{\underset{R}{|}}{N}H \cdot HCl + XCH_2COOH \xrightarrow{\text{chloride of phosphorous}}$$

$$\text{Ar}-\underset{\underset{R}{|}}{N}-CO \cdot CH_2Cl$$
($D_1$)

$$\text{Ar}-\underset{\underset{R}{|}}{N}-CO \cdot CH_2X + KF \longrightarrow \text{Ar}-\underset{\underset{R}{|}}{N}-CO \cdot CH_2F$$
($D_2$)

wherein X is chlorine or bromine atom.

In the process C, the reaction is proceeding smoothly in an inactive and anhydrous solvent in the presence of chloride of phosphorus such as $PCl_3$, $PCl_5$ and $POCl_3$ at the temperature of 20–140° C. especially 90–100° C.

In the process consisting of step $D_1$ and $D_2$, the first step $D_1$ is proceeding in the same manner as the process C, except to apply chloroacetic acid instead of fluoroacetic acid as a reactant; the second step $D_2$ is the new process in the application for N-substituted fluoroacylamide and it proceeds in a glycol such as ethyleneglycol, diethyleneglycol, lower polymer of ethyleneglycol or their lower alkyl ether e.g. methylcellosolve and ethylcellosolve at the temperature of 100–300° C. especially 120–160° C.

The reaction of fluorination of chloroacylamide with potassium fluoride has not been known and is scarcely carried out because of low yield due to hydrolysis of the chloroacyl group. But, in our investigation, the undesirable hydrolysis was prevented and the yield of the aimed compound was increased sufficiently to be suitable as an industrial method by the introduction of a group in the N-position of chloroacetylamide.

The following examples will illustrate certain of the many specific embodiments of the invention.

EXAMPLE I

N-methyl-N-(1-naphthyl)-fluoroacetamide (Compound I)

(A) 8.6 g. of fluoroacetic acid was added to a suspension of 19.4 g. of N-methyl-α-naphthylamine hydrochloride in 80 ml. of anhydrous xylene. The mixture was heated at the temperature of 90–100° C., in which 5 g. of $PCl_3$ in 10 ml. of anhydrous xylene was added dropwise for a period of ½–1 hour. Then, the mixture was heated at 135–140° C. for 1–2 hours. In the mixture, crystals of amine hydrochloride separated out and red or reddish brown oxides of phosphorus appeared at the bottom of reactor. The liquid layer was poured in a distillator and the solvent was removed. The raw crystals were obtained as the residue, and washed by water and dried. Obtained were 18.4 g. of colorless plates, N-methyl-N-(1-naphthyl)-fluoroacetamide, M.P. 87–88° C.

Analysis.—Calculated for $C_{13}H_{12}FNO$: N, 6.45%. Found: N, 6.37%.

(B) A solution of 5.4 g. of $PCl_3$ in anhydrous xylene was added dropwise to a suspension of 47.2 g. of N-methyl-α-naphthylamine hydrochloride and 18.8 g. of bromoacetic acid in 240 ml. of anhydrous xylene at a temperature of 90–100° C. for a period of ½–1 hour under agitation. Then, the mixture was heated at 135–140° C. for 1–2 hours. The liquid layer of the mixture was poured and distilled to remove the solvent, 30.5 g. of colorless plates, M.P. 66–67.5° C., of N-methyl-N-(1-naphthyl)-bromoacetamide was obtained from the residue after washing with water and drying.

27.8 g. of N-methyl-N-(1-naphthyl)-bromoacetamide and 11.6 g. of anhydrous potassium fluoride were added to 48 ml. of ethyleneglycol, and the mixture was heated at 130–135° C. for 1.5 hours under agitation. Then, the mixture was cooled to room temperature and poured in 300 ml. of cold water.

Raw crystals were separated. The crystals were washed satisfactorily with water and dried, and recrystallized in a mixed solvent of n-hexane and n-butanol. 16.6 g. of colorless plates, M.P. 87–88° C., of N-methyl-N-(1-naphthyl)-fluoroacetamide were obtained.

EXAMPLE II

N-methyl-2·4·5-trichloro-fluoroacetanilide (Compound II)

A solution of 10.1 g. of $POCl_3$ in anhydrous xylene was added dropwise to a mixture of 26.4 g. of 2·4·5-trichloroaniline hydrochloride and 12.6 g. of chloroacetic acid in 160 ml. of anhydrous xylene at the temperature of 90–100° C. for a period of ½–1 hour under agitation. Then, the mixture was heated at 135–140° C. for 1–2 hours. The liquid layer of the mixture was poured and distilled to remove the solvent, and 31.0 g. of colorless needles, M.P. 83–84° C., of N-methyl-2·4·5-trichloro-chloroacetanilide was obtained from the residue after washing by water and drying.

28.7 g. of N-methyl-2·4·5-trichloro-chloroacetanilide and 11.6 of anhydrous potassium fluoride were added to 47 ml. of propyleneglycol, and the mixture was heated at 120–125° C. for 2 hours under agitation.

Then, the mixture was cooled to room temperature and poured into 300 ml. of cold water. Raw crystals were separated. The crystals were washed thoroughly with water and dried, and recrystallized in a mixed solvent of n-hexane and n-butanol. 21.8 g. of white plate crystals were obtained. M.P. 117–180° C.

Analysis.—Calculated for $C_9H_7Cl_3FNO$: N, 5.71%. Found: N, 5.31%.

EXAMPLE III 2-(N-methylfluoroacetamido)-4,5 dimethylthiazole (Compound III)

A solution of 7.6 g. of $PCl_5$ in anhydrous xylene was added dropwise to a mixture of 17.8 g. of 2-methylamino-4,5-dimethylthiazole hydrochloride and 8.6 g. of fluoroacetic acid in 130 ml. of anhydrous toluene at the temperature of 90–100° C. for a period of ½–1 hour under agitation. Then, the mixture was heated at 135–140° C. for 1–2 hours. The liquid layer of the reaction mixture was poured and distilled to remove the solvent, and 17.6 g. of colorless needles, M.P. 115–116° C., were obtained from the residue after washing with water and drying.

Analysis.—Calculated for $C_8H_{11}FN_2OS$: N, 13.87%. Found: N, 14.46%.

EXAMPLE IV

N-3-dimethyl-fluoroacetanilide (Compound IV)

A solution of 5 g. of $PCl_3$ in anhydrous xylene was added dropwise to mixture of 15.8 g. of N·3-dimethylaniline hydrochloride and 8.6 g. of fluoroacetic acid in 150 ml. of anhydrous toluene at the temperature of 90–100° C. for a period of ½–1 hour under agitation. Then, the mixture was heated at 135–140° C. for 1 –2 hours. The liquid layer of the mixture was poured and distilled to remove the solvent, and 15.3 g. of colorless needles, M.P. 86–87° C., were obtained from the residue after washing with water and drying.

Analysis.—Calculated for $C_{10}H_{12}FNO$: N, 7.73%. Found: N, 8.09%.

EXAMPLE V 2-(N-methylfluoroacetamido)-thiazole (Compound V)

19 g. of 2-(N-methylchloroacetamido)-thiazole and 11 g. of potassium fluoride anhydride were added to 50 ml. of ethyleneglycol, and the mixture was heated at 130–135° C. for 2 hours. Then, the mixture was cooled to room temperature and poured into 300 ml. of cold water. The raw crystals were separated. The crystals were washed by water and dried, and recrystallized in a mixed solvent of n-hexane and n-butanol. 13.2 g. of 2-(N-methylfluoroacetamido)- thiazole were obtained. M.P. 154–155° C.

Analysis.—Calculated for $C_6H_7FN_2OS$: N, 16.10%, Found: N, 15.80%.

EXAMPLE VI

N-ethyl-(1-naphthyl)-fluoroacetamide (Compound VI)

37.1 g. of N-ethyl-(1-naphthyl)-chloroacetamide and 17.4 g. of anhydrous potassium fluoride were added to 100 ml. of ethyleneglycol, and the mixture was heated at 130–135° C. for 2 hours under agitation. Then, the mixture was cooled to room temperature and poured into 500 ml. of cold water. The precipitates were gathered by filtration and washed with water and dried, and recrystallized in a mixed solvent of n-hexane and n-butanol. 27.4 g. of colorless plates were obtained. M.P. 89–90° C.

Analysis.—Calculated for $C_{14}H_{14}FNO$: N, 6.06%. Found: N, 6.14%.

In addition to above mentioned compounds described in the preceding examples, some of typical compounds of the present invention are listed in Table I.

However, these examples and Table I include merely a part of compounds of the present invention, so that the objectives of the present invention are not limited only in those compounds listed in Table I.

TABLE I

Ar—N—COCH₂F
    |
    R

| No. of compd. | Ar | R | [M.P.](B.P.) °C./mm. Hg | Formula | Analysis for N (percent) Found | Calcd. |
|---|---|---|---|---|---|---|
| VII |  | —CH₃ | [88–89] | C₉H₁₀FNO | 8.17 | 8.38 |
| VIII |  | —CH₂— 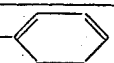 | [81–82] | C₁₉H₁₆FNO | 5.00 | 4.78 |
| XI | F— | —CH₃ | [70–71] (97–98) 0.25 | C₉H₉F₂NO | 7.38 | 7.56 |
| X | F— | —CH₂CH₂OH | [143–144] 0.1 | C₁₀H₁₁F₂NO₂ | 6.65 | 6.51 |
| XI | Cl— | —CH₂CH₂OH | [84–85] (134–135) 0.1 | C₁₀H₁₁ClFNO₂ | 5.95 | 6.05 |
| XII | NO₂— | —CH₃ | [115–116] | C₉H₉FN₂O₃ | 12.85 | 13.22 |
| XIII |  | —C₂H₅ | [80–81] | C₁₀H₉Cl₃FNO | 5.22 | 4.92 |
| XIV | 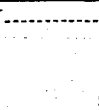 | —CH₂CH₂OH | (189–190) 0.2 | C₁₄H₁₄FNO₂ | 5.82 | 5.66 |
| XV | 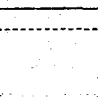 | —CH₃<br>—ĊH—CH₂OH | Viscous liquid. | C₁₅H₁₆FNO₂ | 5.52 | 5.36 |
| XVI | 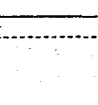 | —CH₂—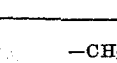 | [89–90] | C₁₉H₁₆FNO | 5.07 | 4.78 |
| XVII | 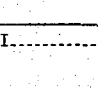 | —CH₃ | [105–106] | C₁₃H₁₂FNO | 6.65 | 6.45 |
| XVIII |  | CH₃<br>—ĊH·CH₂OH | Viscous liquid. | C₁₅H₁₆FNO₂ | 5.14 | 5.36 |
| XIX | 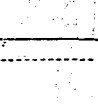 | —CH₂—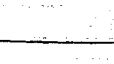 | [107–108] | C₁₉H₁₆FNO | 4.95 | 4.78 |
| XX | 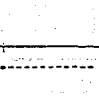 | —CH₃ | [144–145] | C₅H₆FN₃O₃S | 18.98 | 19.18 |
| XXI | 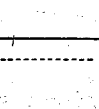 | —CH₃ | [136–137] | C₇H₆FN₃OS₂ | 18.06 | 18.19 |

EXAMPLE VII

Emulsive agent

| | Parts by weight |
|---|---|
| Compound III | 20 |
| Dimethyl formamide | 35 |
| Xylene | 38 |
| Nonionic surfactant | 7 |

These were mixed and dissolved. In practical use, this solution was diluted in 1,000–2,000 times the amount of water to produce the suspension, which was applied as a spray for use in accordance with the invention.

EXAMPLE VIII

Emulsive agent

| | Parts by weight |
|---|---|
| Compound I | 25 |
| Cyclohexanone | 30 |
| Toluene | 35 |
| Nonionic surfactant | 5 |
| Alkylbenzenesulphonate | 5 |

These were mixed and dissolved altogether. For practical use, the emulsive solution was diluted in 1,000–2,000 times the amount of water and sprayed over the vegetation.

EXAMPLE IX

Hydration agent

| | Parts |
|---|---|
| Compound II | 25 |
| Higher alcohol sulphate | 5 |
| Diatomaceous earth | 70 |

These were mixed altogether and then crushed in fine powders. In practical use, the mixture was diluted with water to produce the suspension; and was sprayed.

EXAMPLE X

Hydration agent

| | Parts |
|---|---|
| Compound XIII | 30 |
| Alkylarylsorbitanlaurate | 8 |
| Hiflow-supercell | 62 |

These were mixed and crushed in fine powders to produce the hydration agent.

In practical use, the mixture was diluted with water in an appropriate ratio, and this suspension was sprayed.

EXAMPLE XI

Powder agent

| | Parts |
|---|---|
| Compound II | 5 |
| Talc | 94.9 |
| Alkylallylpolyoxyethylene | 0.1 |

These were mixed and crushed to a fine powder. The powder agent was sprayed.

EXAMPLE XII

Hydration agent

| | Parts |
|---|---|
| Compound I | 20 |
| 4-chlorophenyl-4-chlorobenzene sulfonate | 25 |
| Diatomaceous earth | 45 |
| Polyoxyethylenealkylphenylether | 10 |

These components were mixed and crushed into a fine powder to prepare the hydration agent. For practical use, the hydration agent was diluted by water in an appropriate ratio; and the suspension was sprayed.

In Examples VII–XII, anionic surfactants, for example alkbenzensulphonate or higher alcohol sulphonate; and nonionic surfactants, for example alkylarylpolyoxyethylene or alkylarylsorbitanelaurate, may be used as emulsifying, wetting or dispersing agents. Talc, kaolin and diatomaceous earth can be used as carrier. Xylene and toluene can be used as the solvent.

Insecticidal and miticidal effect of the novel compounds of the invention are shown by the following tests.

TEST I

Insecticidal effect to housefly (*Musca domestica*)— (topical application method)

Female adults of housefly (*Musca domestica*) in a period of three days after emergence, which are resistant against dichlorodiphenyl trichloroethane (DDT) and were provided by Infections Disease Research Institute, were tested by topical application method; the acetone solutions of the various compounds were applied to the female adults of housefly and mortalities were investigated in the course of 24 hours. The results are shown in Table II.

TABLE II.—MORTALITY OF TOPICAL APPLICATION FOR ADULT FLIES.

| No. of compound | Mortality (percent) | No. of compound | Mortality (percent) |
|---|---|---|---|
| I | 25 | VII | 100 |
| II | 50 | IX | 100 |
| III | 92 | XII | 52 |
| IV | 100 | XIII | 98 |
| V | 80 | XVII | 60 |
| VI | 52 | | |

NOTE.—Dose of application, 10γ compound/fly.

TEST II

Insecticidal effect to weevil (Curculionidae species, *Bruchus pisorum*)—(dipping method)

Adults of weevil in a period of 24 hours or less after emergence were dipped in the acetone solutions of various tested compounds in a period of 3 seconds, and the mortalities in the course of 48 hours were investigated. The result is shown in Table III.

TABLE III.—MORTALITY (PERCENT) FOR WEEVIL IN DIPPING METHOD

| No. of compd. | Content of compd. in suspn. | | No. of compd. | Content of compd. in suspn. | |
|---|---|---|---|---|---|
| | 1% | 0.5% | | 1% | 0.5% |
| I | 100 | 100 | XI | 64 | |
| II | 100 | 100 | XII | 100 | 100 |
| III | 100 | | XIII | 100 | 100 |
| IV | 100 | | XIV | 64 | |
| V | 100 | | XV | 100 | 80 |
| VI | 80 | | XVII | 100 | 100 |
| VII | 100 | 100 | XVIII | 88 | 64 |
| IX | 100 | 100 | XXII | 72 | |
| X | 100 | | | | |

TEST III

Insecticidal effect to peach red aphid (Cinara species)—(pot test)

The dilute solution of the tested compounds were sprayed over peach red aphids which were parasitic on radish (*Raphances sativus*) grown in 12 cm. diameter of pots in a green house, and the mortalities were investigated in the course of 24 hours.

TABLE IV.—MORTALITY (PERCENT) FOR PEACH RED APHID IN POT TEST

| No. of compd. | Content of compd. in suspn. | | No. of compd. | Content of compd. in suspn. | |
|---|---|---|---|---|---|
| | 0.025% | 0.005% | | 0.025% | 0.005% |
| I | 95 | 55 | XII | 100 | 66 |
| II | 100 | 76 | XIII | 86 | 60 |
| III | 97 | | XIV | 98 | |
| V | 99 | 83 | XV | 84 | 45 |
| IX | 89 | 94 | XVII | 99 | 95 |
| X | 96 | 68 | XVIII | 95 | |
| XI | 99 | | XX | 100 | |

TEST IV

Insecticidal and ovicidal effects to citrus red mite (*Panonychus citri*)—(glass plate method)

Leaves of Sommer orange (*Citrus aurantium natsudaidai* Makino et Nemoto) infested with citrus red mites were collected in an orchard. These leaves were put into glass plates with lids one by one. Then, on the leaves, the water suspensions of hydration agents including a different tested compound are sprayed respectively. Insecticidal and ovicidal data were shown in Table V.

mortality was investigated in the course of one month after sprayed.

TABLE V.—INSECTICIDAL AND OVICIDAL EFFECTS TO CITRUS RED MITE

| | Mortality (percent) | | | | | | | |
|---|---|---|---|---|---|---|---|---|
| | Adult | | | | Egg | | | |
| | Content of compd. in suspn. | | | | Content of compd. in suspn. | | | |
| No. of compd. | 0.05% | 0.025% | 0.0125% | 0.003% | 0.05% | 0.025% | 0.0125% | 0.003% |
| I | 100 | 100 | 100 | 100 | 100 | 100 | 100 | 100 |
| II | | 100 | 100 | 76 | | 100 | 100 | 97 |
| III | | 100 | 100 | | | 100 | 68 | |
| IV | 100 | 100 | 100 | 93 | 100 | 91 | 90 | 35 |
| V | 100 | | | | 100 | | | |
| VI | 100 | | 100 | 100 | | | | 32 |
| VII | | 100 | 100 | | | 100 | 92 | |
| VIII | 100 | | | | 100 | | | |
| IX | | 100 | | 72 | | 100 | | 81 |
| X | | | 100 | | | | 63 | |
| XI | | | 100 | | | | 25 | |
| XII | | 100 | | 100 | | 100 | | 100 |
| XIII | | 100 | | 36 | | 99 | | 76 |
| XIV | | 100 | 100 | | | 100 | 68 | |
| XV | | 100 | | 38 | | 100 | | 19 |
| XVI | 85 | | | | 50 | | | |
| XVII | | 100 | | 100 | | 100 | | 100 |
| XVIII | | 100 | | 25 | | 87 | | 34 |
| XIX | 100 | | | | 100 | | | |
| XX | | 100 | 100 | | | 100 | 68 | |
| XXI | 50 | | | 81 | | | | |

TEST V

Insecticidal effect to two-spotted spider mite (*Tetranychus tebarius*)—(pot test)

About 30 female adults of two-spotted spider mite (*Tetranychus tebarius*) are made to migrate upon main leaves of kidney beans which were sowed and sprouted on 6 cm. diameter pots and left for 7 to 10 days. After one day the water suspensions of hydration agents containing a 0.05% of different tested compounds were sprayed on the leaves respectively. 3 days after spraying, the mortality of adults was investigated, and all adults were removed. The eggs on the leaves were observed for a period of 7 days, to find out how many of them could not incubate.

Then, the larvae were observed for 5 days to see whether they could grow to adults.

Insecticidal and ovicidal data are shown in Table VI.

TABLE VI.—INSECTICIDAL AND OVICIDAL EFFECTS TO TWO-SPOTTED SPIDER MITE

| No. of compd. | Mortality (percent) | | No. of compd. | Mortality (percent) | |
|---|---|---|---|---|---|
| | Adult | Egg | | Adult | Egg |
| I | 100 | 100 | XI | 100 | 100 |
| II | 100 | 100 | XII | 100 | 100 |
| III | 100 | 100 | XIII | 100 | 100 |
| IV | 100 | 100 | XIV | 100 | 100 |
| V | 100 | 100 | XV | 95 | 100 |
| VI | 100 | 100 | XVI | 87 | 50-100 |
| VII | 95 | 100 | XVII | 100 | 100 |
| VIII | 60 | 50-100 | XVIII | 100 | 100 |
| IX | 100 | 100 | XX | 100 | 100 |
| X | 100 | 100 | | | |

TEST VI

Insecticidal effect to arrowhead scale (*Unaspis Yanonensis*)

A. Insecticidal effect to larva.—Leaves mandarin orange (*Citrus unshiu* Marc.) infested with female 2nd-instar larvae of arrowhead scale were collected in an orchard. These leaves were put into glass plates with lids one by one. Then, on the leaves, the water suspensions of hydration agents including a 0.05% of different tested compounds were sprayed respectively. In the course of 17 days after sprayed, the mortality was investigated on an assumption that the ones not grown from 2nd-instar larvae to immature adults were taken as dead.

B. Insecticidal effect to adult.—Leaves of mardarin orange infested with female adults of arrowhead scale were collected and treated in accordance with A. The

TABLE VII.—INSECTICIDAL EFFECT TO ARROWHEAD SCALE

| No. of Compd. | Mortality (percent) | | No. of Compd. | Mortality (percent) | |
|---|---|---|---|---|---|
| | Larva | Adult | | Larva | Adult |
| I | 82 | | XI | 100 | |
| II | 100 | | XII | 100 | |
| III | | 65 | XIII | 95 | |
| IV | | 87 | XIV | 100 | |
| V | | 100 | XVII | | 50 |
| VI | 65 | | XVIII | 87 | |
| IX | 85 | 85 | XIX | 68 | |
| X | 87 | | XX | 78 | |

TEST VII

Insecticidal effect to white peach scale (*Pseudococcus comstocki*)

A water suspension containing 0.05% or 0.025% of tested compound was sprayed on pumpkin (Curcurbia species) infested with female adults of white peach scale of pri-oviposition. Then, the mortality was investigated in a period of three days after sprayed.

TABLE VIII.—INSECTICIDAL EFFECT TO WHITE PEACH SCALE

| No. of compd. | Mortality (percent) | | No. of compd. | Mortality (percent) | |
|---|---|---|---|---|---|
| | 0.05% | 0.025% | | 0.05% | 0.025% |
| I | 100 | 100 | IX | 77 | 78 |
| II | 51 | | XII | 84 | 79 |
| III | 100 | 89 | XIII | 100 | 75 |
| V | 98 | | XVII | 100 | 60 |

TEST VIII

Acute oral toxicity for mouse

Value of $LD_{50}$ for mouse relating to tested compound was measured by the usual method and the result is shown in Table IX.

TABLE IX.—ACUTE ORAL TOXICITY FOR MICE $$Ar-N-C-CH_2F$$
$$\phantom{Ar-N}|\phantom{-}\|$$
$$\phantom{Ar-N-}R\phantom{-}O$$

| No. of compd. | Ar | R | $LD_{50}$ (mg./kg.) (per os mouse) |
|---|---|---|---|
| IX | F—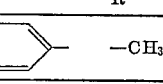— | —CH₃ | 50 |
| X | F—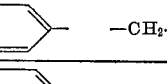— | —CH₂·CH₂·OH | 75 |
| XI | Cl—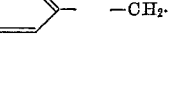— | —CH₂·CH₂·OH | 82 |

| | | | |
|---|---|---|---|
| XII | 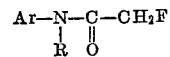NO$_2$-⟨⟩- | —CH$_3$ | 68 |
| IV | CH$_3$ substituted phenyl | —CH$_3$ | 38 |
| II | 2,4-Cl, Cl-⟨⟩- with Cl | —CH$_3$ | 187 |
| XIII | Cl, Cl, Cl-trichlorophenyl | —C$_2$H$_5$ | 167 |
| I | naphthyl | —CH$_3$ | 372 |
| XIV | naphthyl | —CH$_2$·CH$_2$·OH | 143 |
| XV | naphthyl | —CH·CH$_2$·OH with CH$_3$ | 108 |
| XVII | naphthyl (other) | —CH$_3$ | 63 |
| XVIII | naphthyl (other) | —CH·CH$_2$·OH with CH$_3$ | 100 |
| XIX | naphthyl (other) | —CH$_2$-⟨⟩ | 241 |
| III | CH$_3$, CH$_3$-thiazolyl (N, S ring) | —CH$_3$ | 145 |

We claim:
1. Insecticidal composition, comprising a carrier adapted for application to areas of insect infestation, and an insecticidally effective amount of a compound of the formula:

$$\text{Ar—N—C—CH}_2\text{F}$$
$$\quad\ \ |\ \ \ ||$$
$$\quad\ \ \text{R}\ \ \text{O}$$

wherein Ar is naphthyl and wherein R is selected from the group consisting of alkyl of up to 4 carbon atoms, hydroxyalkyl of 2–4 carbon atoms, benzyl and naphthylmethyl.

2. Composition according to claim 1 wherein said compound is N-methyl-N-(1-naphthyl)-fluoroacetamide.

3. Insecticidal composition according to claim 1 wherein R is naphthylmethyl.

4. Method of killing insects, which comprises contacting the insects to be killed with an effective amount of a compound of the formula:

$$\text{Ar—N—C—CH}_2\text{F}$$
$$\quad\ \ |\ \ \ ||$$
$$\quad\ \ \text{R}\ \ \text{O}$$

wherein Ar is naphthyl and wherein R is selected from the group consisting of alkyl of up to 4 carbon atoms, hydroxyalkyl of 2–4 carbon atoms, benzyl and naphthylmethyl.

5. Method according to claim 4 wherein R is naphthylmethyl.

References Cited

UNITED STATES PATENTS

| | | | |
|---|---|---|---|
| 2,409,315 | 10/1946 | Rigby et al. | 260—562 |
| 2,863,752 | 12/1958 | Hamm et al. | 260—562 |
| 2,409,315 | 10/1946 | Rigby | 260—561 |
| 3,255,247 | 6/1966 | Olin | 260—562 |

OTHER REFERENCES

Bergmann et al.: Chem. Abstracts, vol. 51, col. 17073f (1957).

Hickenbottom: Reactions of Organic Compounds (London, 1948), pp. 227–230 and 294–298.

Lovelace et al.: Aliphatic Fluorine Compounds (New York, 1958), pp. 3, 220 and 261–262.

Chem. Abstracts, vol. 51, p. 17073f (1957).

ALBERT T. MEYERS, *Primary Examiner.*

S. FRIEDMAN, *Assistant Examiner.*

U.S. Cl. X.R.

260—306.8, 562; 424—270